United States Patent

Lash

[15] 3,646,601
[45] Feb. 29, 1972

[54] OFF-ANGLE BALANCE CORRECTION METHOD AND APPARATUS

[72] Inventor: Joseph F. Lash, Ferndale, Mich.
[73] Assignee: General Motors Corporation, Detroit, Mich.
[22] Filed: Oct. 22, 1969
[21] Appl. No.: 868,500

[52] U.S. Cl. ............................................................73/462
[51] Int. Cl. ......................................................G01n 1/22
[58] Field of Search ...........................................73/462, 66

[56] References Cited

UNITED STATES PATENTS 2,331,733  10/1943  Senger ..............................73/66 UX
3,248,951  5/1966  Trimble ..............................73/462

Primary Examiner—James J. Gill
Attorney—Jean L. Carpenter, Paul Fitzpatrick and Warren D. Hill

[57] ABSTRACT

The amount and angle of unbalance of a rotary workpiece are measured and the position of unbalance is oriented between two angularly spaced correction drills. If the position of unbalance is not centered between the drills, then the drill depth at each location is compensated by a factor proportional to the product of the off-angle amount and the amount of unbalance.

6 Claims, 3 Drawing Figures

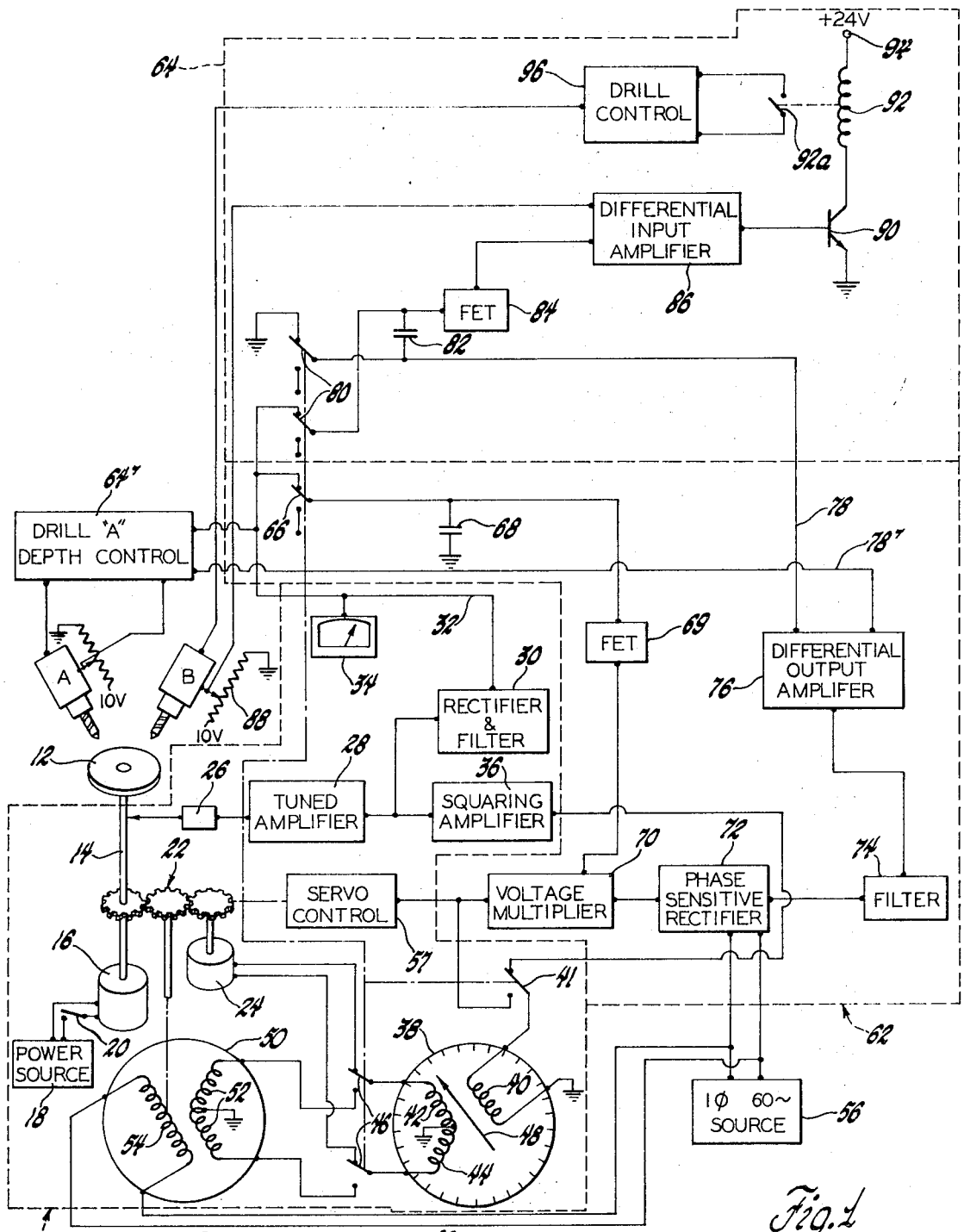
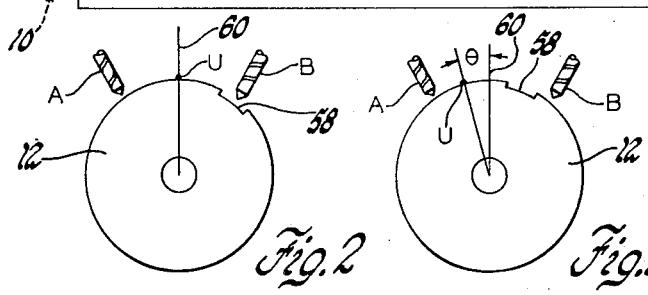
Fig.1
Fig.2     Fig.3
INVENTOR.
Joseph F. Lash
BY
Warren D. Hill
ATTORNEY

OFF-ANGLE BALANCE CORRECTION METHOD AND APPARATUS

This invention relates to a method and apparatus for correcting unbalance in a rotary workpiece and particularly where the correction is made at angularly spaced locations not equidistant from the position of unbalance on the workpiece.

It is often desired to use two angularly spaced corrections to balance a rotary workpiece, for example, where a single point of correction would result in an unacceptably large removal or addition of material. Many workpieces are fashioned so that there are certain regions on their periphery where drilling or other correction is impractical, as where a tapped hole or some necessary appendage is located and must not be interfered with.

It is therefore a general object of this invention to provide a way of compensating for the lack of symmetry between the position of the workpiece unbalance and the correction locations.

It is a further object of this invention to provide a method and apparatus to apportion between two spaced correction points the amount of correction required to compensate for a workpiece unbalance displaced from a position midway between the correction points.

It is another object of the invention to provide a method and apparatus for balancing a rotary workpiece having its position of unbalance spaced unequally from a pair of correction locations.

It is an additional object to provide in an operation for balancing a rotary workpiece wherein the location of unbalance is unequally spaced from a pair of correction locations by some angle, a method and apparatus to derive a correction compensating signal or signals proportional to the angle.

The invention is carried out by measuring the amount and the position of unbalance in a rotary workpiece, turning the workpiece to a desirable correction position, determining the angle between the unbalance location and the position midway between the correction locations and multiplying that angle by the amount of unbalance to derive a compensation factor. The compensation factor is added to the amount of unbalance to determine the amount of correction required at one correction point and is subtracted from the amount of unbalance to determine the amount of correction required at the other correction point.

The invention is also carried out by providing an apparatus for measuring the amount and position of workpiece unbalance and storing values representing the same, apparatus for determining the off-angle amount after the workpiece has been oriented in a preferred correction position, a multiplier for deriving the product of the off-angle amount and the amount of workpiece unbalance and further apparatus responsive to the product for deriving a compensation factor and a circuit for adding the compensation factor to the amount of unbalance to determine the magnitude of correction at one location and for subtracting the compensation factor from the amount of unbalance to establish the amount of correction at the other location.

The above and other advantages will be made more apparent from the following specification taken in conjunction with the accompanying drawings wherein like reference numerals refer to like parts and wherein:

FIG. 1 is a schematic electrical diagram of balance measuring and correcting circuitry according to a preferred embodiment of the invention and including a schematic diagram of mechanical balance correcting devices;

FIGS. 2 and 3 are diagrammatic illustrations of a workpiece with its unbalance location midway between a pair of correcting drills and off-angle from the midpoint respectively.

The general organization of the apparatus revealed in FIG. 1 includes a rotary workpiece 12 to be balanced and correction drills A and B positioned adjacent the workpiece to remove material at spaced points on the periphery of the workpiece to compensate for the unbalance. An unbalance measuring and indexing circuit 10 measures the position and amount of unbalance, and then orients the workpiece 12 to locate the position of unbalance midway between the drills A and B. The circuit 10 supplies information regarding the amount of unbalance to identical drill depth control circuits 64 and 64' which will then be programmed to effect equal workpiece penetrations by the drills A and B. In the event it is undesirable to drill the workpiece 12 in its indexed position the workpiece is rotated to a preferred angular position and the amount of that angular displacement is measured by the measuring circuit 10 and that information is fed to an off-angle correction circuit 62. The circuit 62 computes a compensation factor which is supplied to the depth control circuit 64,64' to adjust the penetration setting for each drill.

The preferred embodiment of the invention illustrated in FIG. 1 is based on a balance correction system using drills A and B for correcting the unbalance in a workpiece. However, other ways of removing material or even ways of adding material to the workpiece may be utilized. FIG. 1 shows an unbalance measuring and indexing circuit 10 operating on a rotary workpiece 12 for determining the amount and angular location of both static (single plane only) and dynamic unbalance. This circuit arrangement is basically like that described in my U.S. Pat. No. 3,319,470, incorporated herein by reference, although a simplified and improved embodiment is specifically shown in FIG. 1.

The workpiece 12 is revolved at the proper speed to determine the unbalance characteristic through a spindle 14 driven by a motor 16 operated by power source 18 through a switch 20. The motor 16 through gearing 22 also drives a two-phase generator 24 at the same speed as the workpiece 12 so as to develop a two-phase reference signal having a frequency corresponding to the rate of rotation of the workpiece 12 and a phase that reflects an electrical zero reference which can correspond, for explanatory purposes, to some imaginary reference point on the workpiece 12. The unbalance characteristics of the workpiece 12 are sensed by a suitable unbalance pickup 26. The unbalance pickup 26 may be any one of many types well known in the art such as magnetic or electrostatic pickups and is positioned relative to the spindle 14 to develop an unbalance signal of sinusoidal waveform. As is well known, the amplitude of the unbalance signal indicates the amount of unbalance and the phase indicates the angular location of unbalance. The electrical output of the pickup 26 is amplified by a tuned amplifier 28 (White Instrument Lab. Model 252) and the amplified output is fed to a rectifier and filter 30 which provides on line 32 a smooth DC level unbalance signal proportional to the amount of unbalance, the magnitude of which is indicated on a meter 34. A squaring amplifier 36 (Fairchild Model 741 OPerational Amplifier) also connected to the output of the tuned amplifier 28, provides a square wave output which is in phase with the tuned amplifier output.

Both the two-phase reference signal from generator 24 and the square wave unbalance signal are supplied to a phase controller 38. The phase controller 38, during the unbalance measuring cycle, serves as a phase comparator or a sensor developing phase comparison information which is stored or preserved so that the phase controller 38 can be said to have a memory function. The phase controller 38 is of known construction and is commercially available. The General Electric polarized vane power factor meter, Type AB-18, is one of such commercially available instruments and will indicate phase angle. The controller 38 includes a single winding 40 which is energized by the square wave unbalance signal through a switch 41 and two quadrature related windings 42 and 44 which are connected by a switch 46 to the two-phase reference generator 24. The phase controller 38 also includes a movable vane 48, depicted as an arrow in the drawings, positioned within the magnetic fields of windings 44, 42 and 40. The square wave shaped unbalance signal on the winding 40 produces a synchronously reversing magnetic field that interacts with the rotating magnetic field of windings 42 and 44 and causes the movable vane 48 to be deflected an amount corresponding to the difference between the phase angles of the unbalance and reference signals. This angular position of the vane 48 is retained after the exitation of the windings 40, 42 and 44 is removed, hence the memory function results with the information being retained for use during the indexing cycle. Thus during rotation of the workpiece 12 the measuring circuit will provide on line 32 a signal level proportional to the amount of unbalance and will provide by the angular position of the vane 48, the angle of unbalance.

To index workpiece 12 to a proper angular position relative to the correction locations, the switches 41 and 46 are moved to a downward position. A resolver 50 of synchro-type construction has a quadrature related stator winding 52 and a single armature winding 54 connected to a single phase 60 cycle reference voltage source 56. Rotation of the armature winding 54 is effected by connection to the gearing 22 so that location of the workpiece 12 during the indexing cycle causes synchronous rotation of the armature winding 54. The outputs of the stator windings 52 are determined by the relative positions of the winding 52 and the armature winding 54, and represent the position of the imaginary reference point on the workpiece 12 relative to the correction locations adjacent drills A and B.

The stator windings 52 are connected to the quadrature windings 42 and 44 of the phase controller 38 through the switch 46. The phase controller performs as a variable coupling transformer with the quadrature windings 42 and 44 serving as the primary and the single winding 40 serving as the secondary. The movable vane 48 establishes coupling between the coils and hence the vane position determines the phase of the signal on the winding 40 relative to the phase of the reference voltage 56. The winding 40 is connected through the switch 41 to a servocontrol 57. The servocontrol 57 is responsive to the signal on the winding 40 and serves to position the workpiece 12 through the gear train 22 to such an angle that the phase shift of the signal on the coil 40 becomes zero. Then the position of unbalance on the workpiece 12 is positioned midway between the drills A and B. The servocontrol 57 is fully described in the aforementioned U.S. Pat. No. 3,319,470 and is not further described herein since it forms no part of the present invention.

Ideally, when the point of unbalance is indexed midway between the drills A and B, a position referred to herein as the midway reference point 60, the portions of the workpiece 12 exposed to the drills are suitable regions for drilling and the drills will then be caused to penetrate to equal depths in the workpiece 12 to an extent determined by the unbalance error on line 32 thereby making a correction for the unbalance in the workpiece 12. If, however, as shown in FIG. 2, either of the drills is adjacent a region of the workpiece 12 not suitable for drilling, as indicated by a slot 58, then the workpiece is rotated through an angle so that the prohibited drilling area 58 is no longer in interference with either of the drills. This workpiece adjustment may be performed by manual manipulation or by an automatic mechanism, not shown. The result as shown in FIG. 3 will be that the position of unbalance U will be no longer midway between the drills but rather will be angularly displaced from the midway reference point 60 by an off-angle $\theta$. Then, in order to balance the workpiece, the drills A and B must penetrate the workpiece 12 to different depths. To accomplish the proper depth adjustment, the off-angle correction circuit 62 is provided.

It can be shown mathematically that when the unbalance position U is displaced from the midpoint reference 60 by an angle $\theta$ that the penetration of the drill nearest the unbalance position U must be increased by an amount proportional to sin $\theta$ and the penetration of the other drill must be decreased by the same amount to achieve substantial correction. As a practical matter for small angles the sin $\theta$ is nearly equal to $\theta$ and accordingly the off-angle correction is performed on the basis of measuring the off angle $\theta$ and making the compensation proportional thereto. Thus, the system is useful only for small angles $\theta$ within a range depending on the accuracy required.

As a general rule, $\theta$ should be limited to 30° on either side of the reference position 60 and in addition, the entire operating off-angle range 2 $\theta$ should not exceed one-half the angular distance between the correction drills. Thus, if the drills are separated by 80° the unbalance position U must be within 20° of the midpoint reference 60. As is well known, the split drilling technique is generally limited to drill separation angles of not greater than 120° since correction effectiveness is greatly reduced at larger separations.

Referring again to FIG. 1, an off-angle correction circuit 62 responsive to the output of the measurement circuit 10 computes the depth compensation required for the off-angle $\theta$ and delivers this information to a depth control circuit 64 for drill B and an identical depth control circuit 64' for drill A.

During the measuring cycle, a switch 66 in the correction circuit 62 is in its upper position to connect the line 32 to a memory capacitor 68 so that the capacitor becomes charged to a level proportional to the amount of unbalance. At the end of the measurement cycle, the switch 66 is moved to its own position so that the charge is stored on the capacitor 68. A field effect transistor 69 is connected between the memory capacitor 68 and an input of a voltage multiplier 70 (Hybrid Systems Corp. Model 107C) such that the latter input has essentially the same voltage as that across the capacitor 68. However, due to the very high resistance of the field-effect transistor 69 the charge is not drained from the capacitor 68. Another input of the voltage multiplier is connected to winding 40 in the phase controller 38 through the switch 41 which remains in its downward position. As discussed above, the phase of the signal from the winding 40 is dependent on the angular orientation of the workpiece 12 and that signal is in phase with the reference source 56 when the unbalance position U is coincident with the midpoint reference 60. However, if the workpiece 12 is displaced through an angle $\theta$ to a new position, the armature winding 54 of the resolver 50 is similarly rotated, causing a corresponding phase shift in the signal winding 40. The latter signal is multiplied in the voltage multiplier 70 by the unbalance signal and the product is then fed to a phase sensitive rectifier 72 (Raytheon Model CK-711) which is referenced to the reference source 56. The produce is thus phase rectified and then smoothed by an RC filter 74 to provide a DC level signal having an amplitude proportional to the product of the amount of unbalance and the magnitude of the off-angle $\theta$ and having a polarity dependent on the direction of phase displacement of the signal in the winding 40, that is, whether the unbalance position U has been moved toward drill A or drill B. This DC level signal is fed to a differential output amplifier 76 (Motorola Model MC 1520) which is effective to provide two outputs of equal magnitude on lines 78 and 78' respectively which are both proportional to the input signal and of opposite polarity.

The depth control circuit 64 during unbalance measurement has a pair of switches 80 effective in their upper positions to connect a memory capacitor 82 between line 32 and ground so that the unbalance signal voltage representing the magnitude of unbalance in the workpiece is impressed across the capacitor 82. Then at the end of the measurement cycle, the switches 80 are moved to their downward positions thereby storing the unbalance signal on the capacitor 82. The lower plate of the capacitor 82 is connected to the output 78 of the differential output amplifier 76. This arrangement has the effect of algebraicly adding the voltage on line 78 to the voltage across the capacitor 82 so that the upper plate of the capacitor assumes a potential which is equal to the unbalance signal plus or minus a value proportional to the product of the angle $\theta$ and the amount of unbalance.

The potential on the upper plate of the capacitor 82 is then transferred by a field effect transistor 84 to one input of a differential input amplifier 86 (Fairchild Model 741 Operational Amplifier), the other input being obtained from a potentiometer 88 having its output controlled by the amount of penetration of drill B. The differential input amplifier 86 then effectively compares the amount of drill penetration with the reference voltage on the capacitor 82 and produces an output when these values are equal. The output of the amplifier 86 is connected to the base of a transistor 90 to turn on that transistor. The transistor 90 is serially connected with a relay coil 92 and a 24-volt power terminal 94 so that when the transistor 90 turns on the relay coil 92 is energized to close relay contacts 92a. The contacts 92a are connected to a drill control 96 of any well-known conventional design which is effective to stop drill penetration. The depth control circuit 64' for drill A operates in exactly the same way as the circuit 64. However, because the outputs 78 and 78' of the differential output amplifier 76 are of opposite polarities, the penetration of drill A will be different than that of drill B except when the off-angle θ is equal to zero. That is, the compensation signals on lines 78 and 78' being equal and opposite will cause the penetration depths of drills A and B to vary from their normal uncompensated values in equal and opposite directions, the circuit being so arranged that the drill nearest the point of unbalance will have the greater penetration. The end result of the compensation is that for small angles of θ a very good approximation of the required correction is made.

It should be understood that the invention is not limited to the exact details of the construction shown and described, and obvious modifications will occur to those skilled in the art.

It is claimed:

1. In balancing a rotary workpiece, a method of determining the amount of balance correction required at each of a pair of angularly spaced correction locations wherein the position of unbalance is between the correction locations and is offset from a reference position midway between the correction locations comprising
    determining the amount and the position of unbalance of the workpiece and producing an unbalance signal representing the amount of unbalance,
    orienting the workpiece to a correction position with its position of unbalance between the correction locations,
    measuring the angle of offset between the reference position and the position of unbalance and producing an off-angle signal representing the amount of angular offset,
    deriving from the off-angle signal and the unbalance signal a compensation signal proportional to the product of the amount of unbalance and the angle of offset,
    adding the compensation signal to the unbalance signal to obtain a value representing the amount of balance correction required at the correction location nearest the position of unbalance and
    subtracting the compensation signal from the unbalance signal to obtain the amount of balance correction required at the other correction location.

2. In balancing a rotary workpiece a method of determining the amount of balance correction required at each of a pair of angularly spaced correction locations wherein the position of unbalance is between the correction locations and is offset from a reference position midway between the correction locations comprising
    determining the amount and the position of unbalance of the workpiece and producing an unbalance signal representing the amount of unbalance,
    orienting the workpiece to a correction position with its position of unbalance midway between the correction locations,
    angularly displacing the workpiece to a preferred position for correction, and producing an off-angle signal representing the angle of displacement,
    multiplying the off-angle signal and the unbalance signal and operating on the product to obtain a compensation factor which is proportional to the angle of displacement and the amount of unbalance
    adding the compensation factor to the amount of unbalance to obtain a value representing the amount of balance correction required at the correction location nearest the position of unbalance and
    subtracting the compensation factor from the amount of unbalance to obtain the amount of balance correction required at the other correction location.

3. In balancing a rotary workpiece a method of determining the amount of balance correction required at each of a pair of angularly spaced correction locations wherein the position of unbalance is between the correction locations and is offset from a reference position midway between the correction locations comprising
    measuring the amount and the angle of unbalance of the workpiece and producing an unbalance signal representing the amount of unbalance
    orienting the workpiece with its position of unbalance between the correction locations
    measuring the angle of offset between the reference position and the position of unbalance to produce an AC signal having a phase relative to a reference signal proportional to the angle of offset,
    multiplying the AC signal by the unbalance signal and phase rectifying the product to produce an offset signal
    operating on the offset signal to produce positive and negative compensation signals having equal magnitude proportional to the offset signal and
    combining the amount of unbalance with the positive and negative compensation signals to obtain the amount of correction required at each correction location.

4. In balancing a rotary workpiece a method of determining the amount of balance correction required at each of a pair of angularly spaced correction locations wherein the position of unbalance is between the correction locations comprising
    producing a first signal proportional to the magnitude of unbalance,
    producing a second signal as a function of the angle of unbalance,
    moving the workpiece in response to the second signal to locate the angular position of unbalance equidistant between a pair of spaced correction locations,
    angularly offsetting the workpiece to a new location and producing a third signal having a phase dependent on the amount of offset and the direction of offset,
    multiplying the first and third signals to produce a fourth signal,
    establishing an amount of balance correction for one of the correction locations dependent on the first signal modified by adding a function of the fourth signal, and
    establishing an amount of balance correction for the other of the correction locations dependent on the first signal modified by subtracting a function of the fourth signal.

5. In a balance measuring apparatus, means for measuring the amount and angular position of unbalance in a rotating body, means for determining the amount of unbalance corrections required at a pair of given angularly spaced correction locations on the periphery of the body when there is an angular displacement between the position of unbalance and a point midway between the correction locations comprising
    means for producing an unbalance signal representing the amount of unbalance,
    means for producing an off-angle signal representing the said angular displacement,
    means for deriving from the off-angle signal and the unbalance signal a compensating signal proportional to the product of the amount of unbalance and the angular displacement,
    means for adding the unbalance signal and the compensating signal to obtain a signal proportional to the correction required at the correction location nearest the position of unbalance, and means for subtracting the compensating signal from the unbalance signal to obtain a signal proportional to the correction required at the correction location furthest from the position of unbalance.

6. In a balance measuring apparatus, means for measuring the amount and angular position of unbalance in a rotating body, means for determining the amount of unbalance corrections required at a pair of given angularly spaced correction locations on the periphery of the body when there is an angular displacement between the position of unbalance and a point midway between the correction locations comprising means for producing an unbalance signal proportional to the amount of unbalance, means for producing an off-angle AC signal having a phase dependent on the angular displacement, means for multiplying the signals to provide a product, phase sensitive rectifying means for operating on the product to derive a compensating signal which is a linear function of the angular displacement and of the amount of unbalance, amplifier means responsive to the compensating signal to produce a pair of equal magnitude signals of opposite sense, and circuit means for combining the unbalance signal with each of the pairs of signals to produce outputs representing the amount of correction required at the correction locations.

* * * * *